Jan. 19, 1960     E. F. CANZANO     2,922,015
ELECTRICALLY OPERATED SNOW-MELTING MACHINE
Filed June 6, 1958
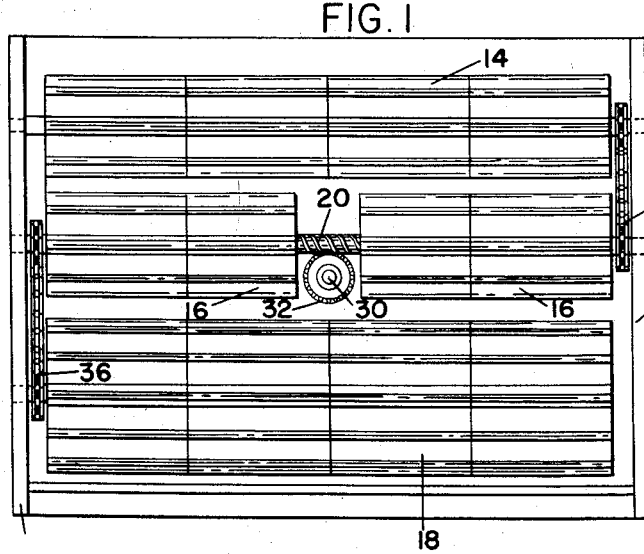
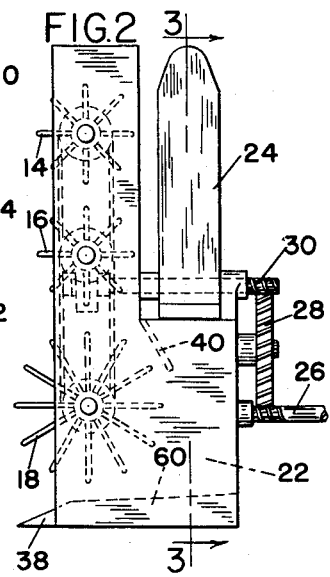
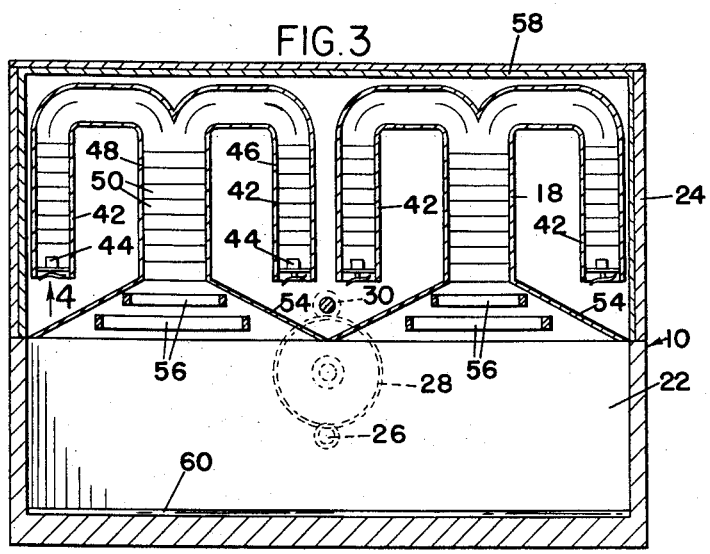
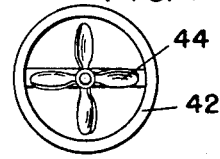
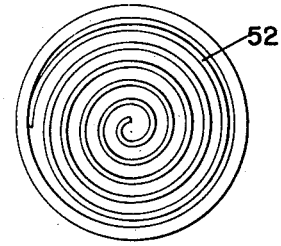
INVENTOR
EMILIO F. CANZANO
ATTORNEY

United States Patent Office 2,922,015
Patented Jan. 19, 1960

2,922,015
ELECTRICALLY OPERATED SNOW-MELTING MACHINE

Emilio F. Canzano, Worcester, Mass.

Application June 6, 1958, Serial No. 740,399

5 Claims. (Cl. 219—19)

This invention relates to a new and improved electrically operated snow and ice melting and disposing machine, and the principal object of the invention resides in the provision of the construction of a portable device adapted to be mounted on a truck and transported from point-to-point, or used in a straight-line for continuous operation, and including electric heating units, air-circulation devices, etc. for maximum efficiency in the utilization of electricity for melting the snow and ice and thereby disposing of the same.

Other objects and advantages of the invention will appear hereinafter.

Reference is to be had to the accompanying drawings, in which—

Fig. 1 is a view in front elevation illustrating the device;

Fig. 2 is a view in side elevation;

Fig. 3 is a section on line 3—3 of Fig. 2;

Fig. 4 is a bottom plan view, looking in the direction of arrow 4 in Fig. 3; and Fig. 5 is a view illustrating the electric units.

In carrying out the present invention, the same may be included in a frame which is adapted to be mounted upon the front end of a truck or the like so that the same may receive power from the truck which may carry a gasoline or diesel generator for providing the electric current needed for carrying out the invention. Furthermore, the device may be carried along on a street to continuously scoop up and melt the snow as the truck moves along; or the vehicle may be disposed in stationary condition and the snow may be brought to the melting device. However, the particular apparatus shown is particularly adapted to continuous operation, i.e., by mounting the device upon a vehicle and slowly moving the same down a street or avenue to be cleared of snow.

Referring now to the drawings in general, there is provided a housing generally indicated at 10. This housing comprises a pair of side walls 12 upon which may be mounted a series of paddle wheels or the like which are herein indicated at 14, 16 and 18. These paddle wheels are arranged as shown in Fig. 1 wherein the top paddle wheel 14 stretches across from wall-to-wall and the same is true of the bottom and larger paddle wheel 18. On the other hand, the wheels 16 which are located intermediate of those at 14 and 18 are divided centrally in order to provide for the power-operating means such as worm-and-wheel 20 adapted to constitute part of the transmission system for the paddle wheels.

These paddle wheels are used merely for scooping the snow into the snow-melting chamber at the lower part of the machine which is generally indicated at 22. It will be seen that the framework 10 provides for an enlarged chamber at the lower portion of the machine and the larger paddle wheel of course scoops the snow into this chamber below the heating chamber which is indicated generally at 24. The upper paddle wheels are used in case of a pile-up of snow in front of the machine and serve to chew the snow up and allow it to be eventually carried into the snow-melting chamber 22.

Means for driving the paddle-wheels may comprise a main shaft 26 operating a worm or other gear 28 in turn operating a worm 30. The gear 20 is operated by the gears shown in Fig. 1 at 32 and in turn operates the two chains 34 and 36 which respectively drive the upper and lower paddle wheels 14 and 18.

The lower part of the housing 10 may be provided with a skid as at 38 by means of which the snow is scooped up from the street and directed into the snow-melting chamber 22. If desired, a baffle indicated at 40, may extend across the machine in order to direct the snow and ice into the location desired.

In the housing 24, there is provided a series of ducts which are made in the shape shown in Fig. 3. Each duct comprises a pair of relatively small vertical, spaced hollow pipe-like members 42, the lower ends of which are open and contain blowers indicated at 44. These blowers suck the relatively cold air in past a series of electric heating units 46 and thence in the direction of the arrows to a central enlarged vertical duct 48 which also is provided with a series of electric heating means or units 50. These heating elements are generally shown but may assume the conventional form of a Calrod heating unit such as indicated at 52 in Fig. 5.

The air passing upwardly through the ducts 42 and thence downwardly through that at 48 is of course very highly heated by the electrical units and at the lower ends of the enlarged pipes 48 there are provided widely diverging conical members 54 containing annular or eliptical air and heat diffusing rings 56 which direct the air throughout the entire chamber 22 to melt the snow and ice as will be clear.

The interior of the chamber at 24 may be insulated as indicated at 58 in order to conserve any heat which may escape from the heating chamber 22 and will naturally rise upwardly and be re-passed through the ducts 42 so that it will be seen that the present invention makes the most efficient use of the electrical heating units as may be possible.

The vehicle to which the new device is attached is not shown, as this may take any form and may in fact be an ordinary truck properly equipped with a power take-off to drive the shaft 26. Also preferably of course it will be provided with a commercial electric generator of any known or desired type which will supply the electric energy needed for the heating units 46 and 50. Thus the device will be seen to be completely self-energized and the melted water may be passed directly from the heating chamber, as for instance pouring down the inclined bottom portion of the heating chamber at 60 to flow into the gutter and through the sewers. Also, of course, any kind of pumping apparatus, hoses, drains, or the like may be utilized in order to carry the melted water off to tanks to be transported away or in any way which may be desired or convenient according to the particular circumstances encountered.

Having thus described my invention and the advantages thereof, I do not wish to be limited to the details herein disclosed, otherwise than as set forth in the claims, but what I claim is:

1. A snow and ice melting machine comprising a base, a vertical housing thereon, a melting chamber at the lower part of said housing and extending to the rear thereof, means to direct snow and ice directly, into said chamber, a generally vertical heating chamber mounted upon said lower chamber behind the first-named vertical housing and parallel thereto, said heating chamber including duct work for the passage of air therethrough, and means to force the air through the duct-work into the melting chamber, a series of electrically heating means in said duct-work, and means diffusing the heated air from the duct-work to the heating chamber.

2. A portable snow and ice melting machine comprising a main housing having a melting chamber therein, power-operated means for directing snow and ice thereinto to be melted therein, an auxiliary housing mounted upon said main housing, means separating said auxiliary housing from said main housing, air duct-work mounted in said auxiliary chamber and leading into the melting chamber, means forcing air through said duct-work, a series of electrically energized heating units located in said duct-work, and means forming a passage from the duct-work to the melting chamber so that the heated air is dispersed into the melting chamber, said duct-work having a plurality of air intake pipes merging into each passage, said intake pipes being arranged to admit heated air thereinto from the interior of the auxiliary housing.

3. The portable snow and ice melting machine of claim 2 including air-diffusing means located at the end of said duct-work to spread the air generally throughout the melting chamber.

4. A snow and ice melting machine comprising a base, a main housing on said base, said main housing being open at one side thereof to receive snow and ice therein, said chamber being otherwise generally closed, a melting chamber of said housing, an auxiliary housing upon said main housing, electric heating units in said auxiliary housing, duct-work forming an air passage having an initial opening in said auxiliary chamber, an exit opening into said melting chamber, and means forcing a draft of air through said duct-work from the auxiliary chamber into the melting chamber, and past said electric heating means to melt snow passing through the main housing into the melting chamber, and power means to force the snow into the main housing and therethrough into the melting chamber.

5. The ice and snow melting machine of claim 4 wherein said duct-work is in the form of a double branched duct, the air being forced through both branches thereof toward a central location, and a central duct leading into the melting chamber, all of said ducts including the electric heating means.

References Cited in the file of this patent

UNITED STATES PATENTS

| | | |
|---|---|---|
| 472,831 | Steel | Apr. 12, 1892 |
| 1,284,873 | Burns et al. | Nov. 12, 1918 |
| 1,598,508 | Saunders | Aug. 31, 1926 |
| 2,111,148 | Judelson | Mar. 15, 1938 |
| 2,231,251 | Chaney | Feb. 11, 1941 |
| 2,428,079 | Hooper | Sept. 30, 1947 |
| 2,680,917 | Finley | June 15, 1954 |